United States Patent [19]

Ahlgren

[11] Patent Number: 5,604,043

[45] Date of Patent: Feb. 18, 1997

[54] HEAT SHRINKABLE FILMS CONTAINING SINGLE SITE CATALYZED COPOLYMERS HAVING LONG CHAIN BRANCHING

[75] Inventor: Kelly R. Ahlgren, Greenville, S.C.

[73] Assignee: W.R. Grace & Co.-Conn., Duncan, S.C.

[21] Appl. No.: 124,179

[22] Filed: Sep. 20, 1993

[51] Int. Cl.$^6$ .................................................. B32B 27/08
[52] U.S. Cl. ........................... 428/518; 428/515; 428/516; 428/517; 428/34.9; 428/36.6; 428/36.7
[58] Field of Search ................................ 428/34.9, 36.6, 428/36.7, 515, 516, 518, 517

[56] References Cited

U.S. PATENT DOCUMENTS

| | | | |
|---|---|---|---|
| 3,161,629 | 12/1964 | Gorsich | 260/94 |
| 4,302,565 | 11/1981 | Goeke et al. | 526/88 |
| 4,302,566 | 11/1981 | Karol et al. | 526/125 |
| 4,352,702 | 10/1982 | Bornstein | 156/84 |
| 4,429,079 | 1/1984 | Shibata et al. | 525/240 |
| 4,457,960 | 7/1984 | Newsome | 428/35 |
| 4,495,249 | 1/1985 | Ohya et al. | 428/516 |
| 4,501,634 | 2/1985 | Yoshimura et al. | 156/244 |
| 4,540,753 | 9/1985 | Cozewith et al. | 526/88 |
| 4,640,856 | 2/1987 | Ferguson et al. | 428/36 |
| 4,701,432 | 10/1987 | Welborn, Jr. | 502/113 |
| 4,724,185 | 2/1988 | Shah | 428/339 |
| 4,729,926 | 3/1988 | Koteles et al. | 428/474.7 |
| 4,762,748 | 8/1988 | Oberle | 428/349 |
| 4,778,699 | 10/1988 | Knox, III et al. | 428/35 |
| 4,789,575 | 12/1988 | Gibbons et al. | 428/34.2 |
| 4,792,488 | 12/1988 | Schirmer | 428/349 |
| 4,798,081 | 1/1989 | Hazlitt et al. | 73/53 |
| 4,863,769 | 9/1989 | Lustig et al. | 428/34 |
| 4,935,397 | 6/1990 | Chang | 502/120 |
| 4,976,898 | 12/1990 | Lustig et al. | 264/22 |
| 5,055,438 | 10/1991 | Canich | 502/117 |
| 5,057,475 | 10/1991 | Canich et al. | 502/104 |
| 5,059,481 | 10/1991 | Lustig et al. | 428/39 |
| 5,084,534 | 1/1992 | Welborn, Jr. et al. | 526/160 |
| 5,088,228 | 2/1992 | Waldie, Jr. | 45/43 |
| 5,206,075 | 4/1993 | Hodgson, Jr. | 428/216 |
| 5,241,031 | 8/1993 | Mehta | 526/348 |
| 5,266,392 | 11/1993 | Land et al. | 428/224 |
| 5,272,016 | 12/1993 | Ralph | 428/516 |
| 5,272,236 | 12/1993 | Lai et al. | 526/348 |
| 5,278,272 | 1/1994 | Lai et al. | 526/348 |
| 5,279,872 | 1/1994 | Ralph | 428/34 |
| 5,283,128 | 2/1994 | Wilhoit | 428/516 |
| 5,302,402 | 4/1994 | Dudenhoeffer et al. | 426/129 |
| 5,374,459 | 12/1994 | Mumpower et al. | 428/36.7 |
| 5,376,394 | 12/1994 | Dudenhoeffer et al. | 426/415 |
| 5,397,613 | 3/1995 | Georgelos | 428/36 |
| 5,397,640 | 3/1995 | Georgelos et al. | 428/349 |
| 5,403,668 | 4/1995 | Wilhoit | 428/500 |
| 5,427,807 | 6/1995 | Chum et al. | 426/393 |

FOREIGN PATENT DOCUMENTS

| | | |
|---|---|---|
| 0416815 | 3/1991 | European Pat. Off. . |
| 0452920 | 10/1991 | European Pat. Off. . |
| 0495099 | 7/1992 | European Pat. Off. . |
| 10276283 | 6/1983 | Japan . |
| 1209825 | 10/1970 | United Kingdom . |
| WO87/03887 | 7/1987 | WIPO . |
| WO90/03414 | 4/1990 | WIPO . |
| WO92/14784 | 9/1992 | WIPO . |
| WO93/03093 | 2/1993 | WIPO . |
| WO93/08221 | 4/1993 | WIPO . |
| WO93/12151 | 6/1993 | WIPO . |
| WO94/09060 | 4/1994 | WIPO . |
| WO94/07954 | 4/1994 | WIPO . |

OTHER PUBLICATIONS

New Polyolefin Resins . . . Plasticope 16–18.
Exxon Cites Breakthrough . . . Modern Plastics 61–62.
Polyolefins Gain Higher . . . Modern Plastics 46–49.
Sequence and Branching . . . Macromolecules 2820–2827.
PW Technology Watch Plastics World 29.
Enter a New Generation . . . Plastics Technology 15–17.
Dow's Patent on Elastic . . . Metallocene Monitor 2–6.

*Primary Examiner*—James J. Seidleck
*Assistant Examiner*—Michael A. Williamson
*Attorney, Agent, or Firm*—Rupert B. Hurley, Jr.; Leigh P. Gregory

[57] ABSTRACT

The present invention is directed to a heat-shrinkable, thermoplastic film or bag which contains at least one homogeneous ethylene alpha-olefin copolymer with long chain branching. Oriented films made in accordance with the present invention exhibit improved processability as well as improved physical properties such as resistance.

33 Claims, No Drawings

HEAT SHRINKABLE FILMS CONTAINING SINGLE SITE CATALYZED COPOLYMERS HAVING LONG CHAIN BRANCHING

FIELD OF THE INVENTION

The present invention is generally directed to heat shrinkable films containing single site catalyzed copolymers which include at least some long chain branching.

BACKGROUND OF THE INVENTION

Shrinkable thermoplastic films have found many useful applications in packaging of meats, cheeses, poultry and numerous other food and non-food products. There is always the search for improvement in these films to make them have better impact resistance, improved optics and improved shrinkability. For example, in U.S. Pat. No. 4,640,856 to Ferguson et al., the multilayer thermoplastic heat shrinkable film was described having improved shrink, toughness and barrier properties. The film included at least one layer of a very low density polyethylene and a gas barrier layer of vinylidene chloride copolymer or ethylene vinyl alcohol. The film was found to be particularly useful for making bags for packaging large cuts of fresh red meat.

U.S. Pat. Nos. 5,059,481, 4,976,898 and 4,863,769, all to Lustig et al., disclose heat shrinkable film suitable for packaging food articles such as frozen poultry, primal meat cuts and processed meat products wherein the film may be a biaxially stretched monolayer film of a very low density polyethylene copolymer or a multilayer film containing very low density polyethylene.

U.S. Pat. No. 4,457,960 to Newsome discloses the use of linear low density polyethylene in multiple layer molecularly oriented films.

Each of the foregoing patents describe the incorporation into heat shrinkable films of conventional ethylene/alpha-olefins produced by Ziegler-Natta catalyst systems. Ziegler-Natta catalytic methods are commonly used throughout the polymer industry and have a long history tracing back to about 1957.

These systems are often referred to as heterogeneous since they are composed of many types of catalytic species each at different metal oxidation states and different coordination environments with ligands. Examples of Ziegler-Natta heterogeneous systems include metal halides activated by an organometallic co-catalyst, such as titanium or magnesium chlorides complexed to trialkyl aluminum and may be found in patents such as U.S. Pat. Nos. 4,302,565 and 4,302,566. Because these systems contain more than one catalytic species, they possess polymerization sites with different activities and varying abilities to incorporate comonomer into a polymer chain.

The result of such multi-site chemistry is a product with poor control of the polymer chain architecture both within the sequence of a single chain, as well as when compared to a neighboring chain. In addition, differences in catalyst efficiency produce high molecular weight polymer at some sites and low molecular weight at others. Therefore, copolymers produced using these systems lead to polymer products which are mixtures of chains some high in comonomer and others with almost none. For example, conventional Ziegler-Natta multi-site catalysts may yield a linear ethylene/alpha-olefin copolymer (HDPE, LLDPE, VLDPE, ULDPE) having a mean comonomer percentage of 10, but with a range of 0% to 40% comonomer in individual chains. This, together with the diversity of chain lengths results in a truly heterogeneous mixture also having a broad molecular weight distribution (MWD).

Linear low density polyethylene (LLDPE) has enjoyed great success as a raw material choice for packaging films. The term LLDPE is generally understood to describe copolymers of ethylene and one or more other alpha olefin monomers which are polymerized at low pressure using a Ziegler-Natta catalyst to achieve a density range of about 0.915 to about 0.940. Although no clear standard exists, LLDPE polymers are often marketed in subgroups of densities such as linear medium density (LMDPE), linear low density polyethylene, linear very low density (VLDPE), or linear ultra low density polyethylene (ULDPE). These classifications are for marketing use and will vary by supplier.

These materials are different from high pressure low density polyethylene (LDPE) which is generally understood in the trade as a highly branched homopolymer having a single low melting point. For example, a 0.92 density LDPE would typically have a melting point at about 112° C. while a corresponding density LLDPE would have melting points at 107°, 120°, and 125° C. The multiple melting points are commonly observed with LLDPE and are a consequence of the above mentioned heterogeneous incorporation of comonomer.

Recently a new type of ethylene copolymer has been introduced which is the result of a new catalyst technology. Examples of introductory journal articles include "Exxon Cites 'Breakthrough' in Olefins Polymerization," Modern Plastics, July 1991, p.61; "Polyolefins Gain Higher Performance from New Catalyst Technologies," Modern Plastics, Oct. 1991, p.46; "PW Technology Watch," Plastics World, Nov. 1991, p. 29; and ", " Plastics Technology, Nov. 1991, p. 15.

Such new resins are produced using metallocene catalyst systems, the uniqueness of which resides in the steric and electronic equivalence of each catalyst position. Metallocene catalysts are characterized as having a single, stable chemical type rather than a volatile mixture of states as discussed for conventional Ziegler-Natta. This results in a system composed of catalyst positions which have a singular activity and selectivity. For this reason, metallocene catalyst systems are often referred to as "single site" owing to the homogeneous nature of them, and polymers and copolymers produced from them are often referred to as single site resins by their suppliers.

Generally speaking, metallocene catalysts are organometallic compounds containing one or more cyclopentadienyl ligands attached to metals such as hafnium, titanium, vanadium, or zirconium. A co-catalyst, such as but not limited to, oligomeric methyl alumoxane is often used to promote the catalytic activity. By varying the metal component and the cyclopentadienyl ligand a diversity of polymer products may be tailored having molecular weights ranging from about 200 to greater than 1,000,000 and molecular weight distributions from 1.5 to about 15. The choice of co-catalyst influences the efficiency and thus the production rate, yield, and cost. Examples of metallocene catalysts are disclosed in U.S. Pat. Nos. 4,701,432, 4,306,041, 5,088,228, 4,935,397, 5,084,534, 3,161,629, 5,055,438, 5,057,475, and in JP 63/175004 and JP 1,101,315.

As a consequence of the single site system afforded by metallocenes, ethylene/alpha-olefin copolymer resins can be produced with each polymer chain having virtually the same architecture. Therefore, the copolymer chains produced from single site systems are uniform not only in chain length, but also in average comonomer content, and even regularity of comonomer spacing, or incorporation along the chain.

In contrast to the above mentioned Ziegler-Natta polymers, these single site metallocene polymers are characterized as having a narrow MWD and narrow compositional distribution (CD). While conventional polymers have MWD's of about 3.5 to 8.0, metallocenes range in MWD from about 1.5 to about 2.5 and most typically about 2.0. MWD refers to the breadth of the distribution of molecular weights of the polymer chains, and is a value which is obtained by dividing the number-average molecular weight into the weight-average molecular weight. The low CD, or regularity of side branches chains along a single chain and its parity in the distribution and length of all other chains, greatly reduces the low MW and high MW "tails". These features reduce the extractables which arise from poor LMW control as well as improve the optics by removing the linear, ethylene-rich portions which are present in conventional heterogeneous resins.

Thus, conventional Ziegler-Natta systems produce heterogeneous resins which reflect the differential character of their multiple catalyst sites while metallocene systems yield homogeneous resins which, in turn, reflect the character of their single catalytic site.

Another distinguishing property of single site catalyzed ethylene copolymers is manifested in their melting point range. The narrow CD of metallocenes produces a narrow melting point range as well as a lower Differential Scanning Calorimeter (DSC) peak melting point peak. Unlike conventional resins which retain a high melting point over a wide density range, metallocene resin melting point is directly related to density. For example, an ethylene/butene copolymer having a density of 0.905 g/cc produced using a metallocene catalyst has a peak melting point of about 100° C., while a slightly lower density ethylene/butene copolymer which was made using a conventional Ziegler catalyst reflects its heterogeneous nature with a melting point at about 120° C. DSC shows that the Ziegler resin is associated with a much wider melting point range and actually melts higher despite its lower density.

It should be noted that at least some previously available ethylene based linear polymers approximated the physical and compositional properties achieved by the present metallocene catalyzed polyolefins. For example, in "Sequence and Branching Distribution of Ethylene/1-Butene Copolymers Prepared with a Soluble Vanadium Based Ziegler-Natta Catalyst," *Macromolecules*, 1992, 25, 2820–2827, it was confirmed that a soluble vanadium based Ziegler-Natta catalytic system $VOCl_3/Al_2(C_2H_5)_3Cl_3$, acts essentially as a single site catalyst although $VOCl_3$ is not a metallocene. Homogeneous copolymers produced by such a catalyst system have been commercially available for several years. An example of such are the resins sold under the tradename Tafmer™ by Mitsui.

U.S. Pat. No. 4,501,634 to Yoshimura et al is directed to an oriented, multilayered film which includes a Tafmer as a blend component in at least one layer.

Japanese Kokoku 37907/83 to Gunze Limited was directed to a heat-sealable biaxially oriented composite film wherein the heat seal layer contains Tafmer in a blend.

The foregoing patents disclose homogeneous ethylene alpha-olefins having densities below 0.90 g/cc. Heretofore, such resins have been generally unavailable in densities at and above 0.90 g/cc because of limitations in the $VOCl_3$ process. Yet, U.S. Pat. No. 1,209,825 to DuPont discloses homogeneous copolymers having densities up to about 0.920 made with single site Zigler catalysts. When extruded into a film the resins exhibit improved physical and optical properties as compared to films of heterogeneous copolymers. However, such homogeneous copolymers of densities above 0.90 g/cc have been commercially unavailable. It is believed that process limitations precluded the manufacture of such resins in any but bench-top quantities. Metallocene catalysts, however, can provide such homogeneous copolymers in a wide range of densities in commercial quantities. Thus, the benefits of homogeneity can now be incorporated into copolymers having densities analogous to those of conventional VLDPEs and LLDPEs.

However, while providing improved physical properties such as optics, low extractables and improved impact, the narrow compositional distribution of some typical metallocene catalyzed resins can cause some processing difficulties. It has been found that such processing problems are avoided if some limited long chain branching is introduced. That is, a typical metallocene catalyzed ethylene alpha-olefin may be thought of as a collection of linear chains, each of substantially identical length, each having approximately the same number of short chain (comonomer) branches distributed at regular intervals along that length. Splicing an abbreviated linear chain with the same regular comonomer distribution onto each of the linear chains, or at least some of the chains in the collection, yields an ethylene alpha-olefin with essentially all of the physical properties of the original copolymer, but with an improved "body" or melt strength for improved processability including improved extrudability, orientation speeds and susceptibility to irradiation.

One way of quantifying the improved processability of the new homogeneous branched ethylene -olefin copolymers is by the melt flow ratio $I_{10}/I_2$ as described in ASTM D-1238. In WO 93/08221 Dow discloses such copolymers and notes that the $I_{10}/I_2$ ratio for such is indicative of the degree of long chain branching. For linear polyolefins the $I_{10}/I_2$ ratio increases as molecular weight distribution increases. Molecular weight distribution may be defined as the ratio of weight average molecular weight (Mw) to number average molecular weight (Mn) or Mw/Mn. Conventional heterogeneous linear ethylene alpha-olefins typically have a high $I_{10}/I_2$ and a correspondingly high molecular weight distribution. Linear homogeneous ethylene α-olefins have a low molecular weight distribution and a correspondingly low $I_{10}/I_2$. But homogeneous ethylene α-olefins with long chain branching such as those supplied by Dow under the Insite trade name have low molecular weight distributions but high $I_{10}/I_2$ ratios. In part, Dow defines these copolymers as having $I_{10}/I_2 \geq 5.63$ and $Mw/Mn \leq (I_{10}/I_2) - 4.63$. This high $I_{10}/I_2$ is an indication of ease of processability discussed above, while the homogeneity, of which Mw/Mn is one measure, provides for improved physical properties also discussed above. A more detailed description of the chemistry and particularly the rheology of these branched homogeneous copolymers is given in WO 93/08221 which is incorporated hereinby reference.

Dow in EP 416,815 disclosed the preparation of ethylene/-olefin copolymers using monocyctopentadienylsilane complexed to a transition metal. Hereagain, homogeneous ethylene copolymers which may be prepared using this catalyst are said to have better optical properties than typical ethylene polymers and be well suited for film or injection molding.

The incorporation of the Dow long chain branched homogeneous ethylene alpha-olefin copolymers into heat shrinkable materials is disclosed generally in copending application U.S. Ser. No. 983,017 which is incorporated herein by reference.

It is thus an object of the present invention to provide a film structure having improved physical properties such as improved optics and impact strength and low extractables.

It is a further object of the present invention to provide a film which is readily extruded and processed.

SUMMARY OF THE INVENTION

These as well as other objects are achieved by providing a film which includes a homogeneous single site catalyzed copolymer of ethylene and an alpha-olefin having from three to ten carbon atoms, wherein the single site catalyzed copolymer includes some long chain branching.

DETAILED DESCRIPTION OF THE PREFERRED EMBODIMENTS

The present invention is directed to a heat-shrinkable, thermoplastic film or bag containing a homogeneous copolymer of ethylene and at least one other alpha-olefin wherein the copolymer contains at least some limited long chain branching. The term "copolymer" as used herein is intended to denote polymers of two or more comonomers. Therefore, although the present specification generally discusses ethylene alpha-olefin copolymers such term is intended to encompass copolymers of ethylene with one or more alpha-olefins or ethylene with an alpha-olefin and another comonomer.

The term "oriented" is used herein interchangeably with the term "heat shrinkable," these terms designating a material which has been stretched and set by cooling while substantially retaining its stretched dimensions. An oriented (i.e. heat shrinkable) material will tend to return to its original unstretched (unextended) dimensions when heated to an appropriate elevated temperature.

The film of the present invention is preferably oriented and is formed by extrusion processes especially art-known coextrusion methods. It is initially cooled to a solid state by, for example, cascading water or chilled air quenching, after which it is reheated to within its orientation temperature range and oriented by stretching. The stretching to orient may be accomplished in many ways such as, for example, by "blown bubble" techniques or "tenter framing." These processes are well known to those skilled in the art and refer to orientation procedures whereby the material is heated to its softening temperature and then stretched in the cross or transverse direction (TD) and/or in the longitudinal or machine direction (MD). After being heated and stretched, the film is quickly quenched while substantially retaining its stretched dimensions to cool the film rapidly and thus set or lock in the oriented molecular configuration.

The film layers may be formed by coextrusion, with additional layers thereafter being extrusion coated thereon to form multilayer films. Two multilayer tubes may also be formed with one of the tubes thereafter being extrusion coated or laminated onto the other. The extrusion coating method of film formation is preferable to coextruding the entire film when it is desired to subject one or more layers of the film to a treatment which may be harmful to one or more of the other layers. This may be done where it is desired to irradiate one or more layers of a film with high energy electrons where the film contains a barrier layer of one or more copolymers of vinylidene chloride (e.g., Saran™), such as vinylidene chloride and vinyl chloride or vinylidene chloride and methyl acrylate as well as vinylidene chloride with ethyl acrylate or acrylonitrile.

Films of this type would, for example, comprise those where the barrier layer is a Saran™ layer in addition to or instead of an EVOH layer. Those skilled in the art generally recognize that irradiation with high energy electrons is generally harmful to such Saran™ barrier layer compositions, as irradiation may degrade and discolor Saran™, making it turn brown. Thus, if full coextrusion followed by high energy electron irradiation of the multilayer structure is carried out on a film having a barrier layer containing a Saran™ layer, the irradiation should be conducted at low levels and with care. Alternatively, this may be avoided by extruding a first layer or layers, subjecting the layer or layers to high energy electron irradiation and thereafter applying the Saran™ barrier layer and, for that matter, other layers (which may or may not have been irradiated) sequentially onto the outer surface of the extruded, previously irradiated, tube. This sequence allows for high energy electron irradiation of the first layer or layers without subjecting the Saran™ barrier layer to harmful discoloration.

Thus, as used herein the term "extrusion" or the term "extruding" is intended to include coextrusion, extrusion coating, or combinations thereof.

As noted, the present heat shrinkable film may optionally be subjected to an energetic radiation treatment, including, but not limited to corona discharge, plasma, flame, ultraviolet, and high energy electron treatment. Irradiation is most preferably performed prior to orientation and, in the case of a Saran-containing barrier structure, prior to extrusion coating of the barrier component. Radiation dosages are referred to herein in terms of the radiation unit "RAD," with one million RADS or a megarad being designated as "MR." A suitable radiation dosage of high energy electrons is in the range of up to about 12 MR, more preferably about 2 to about 9 MR. However, irradiation after orientation, regardless of structure, and performed at lower dosage levels, is also within the scope of the present invention..

For the present multilayer film, each layer will generally serve some function or provide some characteristic to the overall structure. Seal layer composition will be chosen for ease of heat sealing and, depending on the intended end use application, other factors such as grease resistance may be of importance. Outer layer composition may be chosen for abuse resistance or, where a given end use application requires a folded over "lap" seal, sealability to the seal layer. If a barrier layer is required it will be chosen for the degree of gas or moisture impermeability needed for the ultimate product to be packaged. Further internal layers may serve to add bulk to the film, promote shrinkability, promote interlayer adhesion or any combination of these properties.

For purposes of the present invention it has been found that the use of homogeneous ethylene alpha-olefin copolymers with long chain branching in at least one core layer of a multilayer heat-shrinkable film provides improved impact properties and excellent shrink properties. More particularly, for a gas barrier material which includes a core layer of a polymeric material having gas barrier properties such as a vinylidene chloride copolymer or an ethylene vinyl alcohol copolymer, it has been found that further internal layers of such homogeneous, branched ethylene α-olefin copolymers sandwiching the barrier layer provide for a machinable barrier film with improved impact resistance and free shrink. That is, it is within the scope of the present invention to provide a multilayer heat-shrinkable film having the general structure:

seal/core/barrier/core/abuse wherein the respective compositions of the seal, barrier and abuse layers may be chosen from those polymeric resins or resin blends which provide the requisite functional properties. Examples of materials appropriate for use in the seal layer include EVA, LLDPE, VLDPE, EAA, EMAA, ionomers, homogeneous linear ethylene alpha-olefins and homogeneous branched ethylene alpha-olefins. Examples of materials appropriate for use in the abuse layer include EVA, LLDPE, VLDPE, homogeneous linear ethylene alpha-olefins, homogeneous branched ethylene alpha-olefins, polypropylene, nylon, and high density polyethylene. Examples of materials appropriate for use in the barrier layer include vinylidene chloride-vinyl chloride, vinylidene chloride methyl acrylate, ethylene vinyl alcohol, acrilonitrile and nylon. However, other materials which have the needed properties of sealbility and seal integrity, abuse resistance and low gas transmission are also appropriate for use in the seal layer, abuse layer and barrier layer, respectively, of a film in accordance with the present invention. Each of the two core layers contain a homogeneous ethylene alpha-olefin copolymer either alone or in a blend with another polymeric material.

For those applications in which a homogeneous branched ethylene alpha-olefin copolymer provides adequate seal and abuse properties a film having the general structure:

seal/barrier/abuse is also within the scope of the present invention wherein the seal and abuse layer each contain a homogeneous branched ethylene alpha-olefin either alone or in a blend with another polymeric material.

For those applications in which a barrier layer is not required, a film having the general structure:

seal/core/abuse is also within the scope of the present invention wherein the core contains a homogeneous branched ethylene alpha-olefin either alone or in a blend. Further core layers of branched homogeneous ethylene alpha-olefins or other polymeric materials may also be included.

For each of the general structures set forth above it should be noted that further internal layers may be provided to promote inner layer adhesion or add bulk as may be necessary.

It has been found that a preferred method for producing a film in accordance with the present invention is an extrusion coating method such as described above. By such method a portion of the film structure is extruded, cooled and subjected to irradiation prior to be extrusion coated with the remaining layers and subsequently oriented. Preferably, the seal layer and a first core layer are extruded and irradiated prior to extrusion coating of the barrier layer, second core layer and abuse layer and subsequent orientation. Most preferably the seal layer, first core layer and a third layer chosen to promote adhesion to the barrier layer are extruded and irradiated, followed by extrusion coating of the barrier layer, an adhesion promoting tie layer, the second core layer and the abuse layer and then orientation. For the present preferred method it has been found that the use of homogeneous branched ethylene alpha-olefins in the core layers reduces extrusion head pressure and allow for increased orientation speeds.

The following examples are representative of the preferred embodiments of the present films containing homogeneous branched ethylene alpha-olefin copolymers. In order to evaluate such films the following tests were employed:

Free Shrink: The percent dimensional change in a 10 cm.×10 cm. specimen of film when subjected to a selected heat; measured by ASTM D 273.2.

Instrumented Impact: The energy necessary to puncture a restrained specimen of film. The Instrumented. Impact Tester has the ability to measure the tensile/elongation curve to break. The "gradient" is the ratio of the change in force to change in elongation in the straight line portion of the curve. "Peak" is a measure of the maximum force exerted on the specimen to impart rupture. "Impact Energy" is a measure of the energy absorbed by the sample prior to rupture. Instrumented Impact is measured by ASTMD 3763.

Polydispersity (Mw/Mn): A measure of the uniformity of chain lengths within a polymer sample. It defines the breadth of molecular weight distribution. It is obtained by dividing the weight average molecular weight (Mw) by the number average molecular weight (Mn). The Mw and Mn are determined by Gel Permeation Liquid Chromatography.

EXAMPLE 1

A three layer coextruded precursor film having the structure: inner layer/core layer/outermost layer was formed. The inner layer was a blend of 90% by weight of NA 295-000, a 6.7% vinyl acetate EVA supplied by Quantum, 10% by weight of Dowlex 2045, a 0.920 density heterogeneous linear ethylene octene copolymer from Dow. The outermost layer was EP 4062-2, a 15% vinyl acetate EVA supplied by DuPont. The core layer was XU59220.01, lot 427833 a homogeneous ethylene octene copolymer having a density of 0.9016 g/cc and a 0.9 MI with long chain branching sold on a developmental basis by Dow. The resin has an $I_{10}/I_2$ of 1.0.9 and a Mw/Mn of 2.03.

Following irradiation, the precursor film is extrusion coated with a barrier layer of a vinylidene chloride methyl acrylate from Dow blended with an epoxidized soybean oil and an ethylene methyl acrylate, an adhesive layer of Elvax 3175GC, a 28% vinyl acetate EVA from DuPont, a core layer of XU 59220.01, lot 427833 from Dow and an outer abuse layer of a blend of 92.5% by weight of LD 318.92 from Exxon, a 9% vinyl acetate EVA, and 7.5% by weight of Dowlex 2045.

The resultant seven layer film was then oriented by a trapped bubble method out of hot water. The preheat temperature 192° F. and the hot bath was 197° F. The final oriented structure was 1.8 mil thick with the individual layers having target thicknesses as follows:

seal/core/outer//barrier/tie/core/abuse
0.28 0.75 0.13   0.18 0.13 0.18 0.15

EXAMPLE 2

The procedure set forth in Example 1 was repeated with a final oriented structure having a thickness of 2.2 mils. The individual layers had a target thickness as follows:

seal/core/outer//barrier/tie/core/abuse
0.33 1.0  0.14   0.18 0.14 0.24 0.17

EXAMPLE 3

The procedure set forth in Example 1 was repeated with a final oriented structure having a thickness of 2.7 mils. The individual layers had a target thickness as follows:

seal/core/outer//barrier/tie/core/abuse
    0.36 1.39 0.15   0.18 0.15 0.30 0.17

EXAMPLE 4

The procedure set forth in Example, 1 was repeated with the following exceptions. Preheat temperature was 191° F. and the hot bath was 184°. The final oriented structure had a thickness of 3.0 mils. The individual layers had a target thickness as follows:

seal/core/outer//barrier/tie/core/abuse
    0.36 1.59 0.15   0.18 0.15 0.39 0.17

EXAMPLE 5

The procedure of Example 4 was repeated with the only exception being a difference in orientation condition. The preheat temperature was 199° F. and the hot bath was 195° F.

EXAMPLE 6

The procedure set forth in Example 1 was repeated with the core layers being replaced with XU59243.00, a homogeneous ethylene octene copolymer having a density of 0.904 g/cc and a 0.8 MI with long chain branching sold on a developmental basis by Dow. The resin has an $I_{10}/I_2$ of 9.2 and Mw/Mn of 2.17. For orientation, the preheat temperature was 194° F. and the hot bath was 190° F. The final oriented structure had a thickness of 3.0 mils. The individual layers had target thicknesses as follows:

seal/core/outer//barrier/tie/core/abuse
    .36  1.59 .15    .18  .15  .39  .17

EXAMPLE 7

The procedure of Example 6 was repeated with the only exception being different orientation conditions. The preheat temperature was 200° and the hot bath was 195° F.

EXAMPLE 8

The procedure set forth in Example 1 was repeated with the core layers being replaced with XU 59220.00, a homogeneous ethylene octene copolymer having a density of 0.904 g/cc and a 0.9 MI with long chain branching sold on a developmental basis by Dow. The resin has an $I_{10}/I_2$ of 11.3 and an Mw/Mn of 2.4. The preheat temperature was 194° F. and the hot bath was 190° F. The final oriented structure had a thickness of 3.0 mils. The individual layers had target thicknesses as set forth in Example 4 above.

EXAMPLE 9

The procedure of Example 8 was repeated with the only exception being a difference in orientation conditions. The preheat temperature was 200° F. and the hot bath was 195° F.

EXAMPLE 10

The procedure set forth in Example 1 was repeated with the core layers being replaced with XU 59220.01, lot 421733, a homogeneous ethylene octene copolymer having a density of 0.9028 and a 0.9 MI with long chain branching sold on a developmental basis by Dow. The resin has an $I_{10}/I_2$ of 10.5 and an Mw/Mn of 2.4. The preheat temperature was 194° F. and the hot bath was 190° F. The final oriented structure had a thickness of 3.0 mils and individual layers as set forth in Example 4 above.

EXAMPLE 11

The procedure of Example 10 was repeated with the only exception being a difference in orientation conditions. The preheat temperature was 200° F. and the hot bath was 195° F.

EXAMPLE 12

The procedure set forth in Example 1 was repeated with the core layers being replaced with XU 59220.02, a homogeneous ethylene octene copolymer having a density of 0.906 and a 0.8 MI with long chain branching sold on a developmental basis by Dow. The resin has an $I_{10}/I_2$ of 11.8 and an Mw/Mn of 2.2. The preheat temperature was 197° F. and the hot bath was 194° F. The final oriented structure and individual layers had its thickness of 3.0 mils and individual layer as set forth in Example 4 above.

EXAMPLE 13

The procedure of Example 12 was repeated with the only exception being a difference in orientation condition. Preheat temperature was 200° F. and the hot bath was 195° F.

EXAMPLE 14

The procedure set forth in Example 1 was repeated with the core layers being replaced with XU 59220.03, a homogeneous ethylene octene copolymer having a density of 0.898 and a 0.9 MI with long chain branching sold on a developmental basis by Dow. The resin has an $I_{10}/I_2$ of 10.5 and an Mw/Mn of 2.0. The preheat temperature was 187° F. and the hot bath was 181° F. The final structure and individual layers had thicknesses as set forth above in Example 4.

EXAMPLE 15

The procedure of Example 14 with the only exception being a difference in orientation condition. The preheat temperature was 200° F. and the hot bath was 195° F.

EXAMPLE 16

The procedure set forth in Example 1 was repeated with the core layers being replaced with XU 59220.04, a homogeneous ethylene octene copolymer having a density of 0.896 and a 0.9 MI with long chain branching sold on a developmental basis by Dow. The resin has an $I_{10}/I_2$ of 10.5 and an Mw/Mn of 2.17. The preheat temperature was 188° F. and the hot bath was 182° F. The final oriented structure and individual layers had thicknesses as set forth in Example 4 above.

EXAMPLE 17

The procedure of Example 16 was repeated with the only exception being a difference in orientation condition. The preheat temperature 200° F. and the hot bath was 195° F.

EXAMPLE 18

The procedure set forth in Example 1 was repeated with the core layers being replaced with Insite C24, a homogeneous branched ethylene octene copolymer having a density of 0.904 g/cc and a 0.9 MI sold on a developmental basis by Dow. The resin has an $I_{10}/I_2$ of 9.2 and an Mw/Mn of 2.0. The preheat temperature was 200 F. and the hot bath was 195 F. The final structure was 3.0 mils and individual layers had target thicknesses as set forth in Example 4 above.

EXAMPLE 19

For comparative purposes, the procedure set forth in Example 1 was repeated with the core layers being replaced with Attane 4203, a heterogeneous octene copolymer from Dow having a density of 0.905 g/cc and a 0.8 MI. The resin has an $I_{10}/I_2$ of 8.2 and an Mw/Mn of 3.8. The preheat temperature was 194° F. and the hot bath was 190° F. The final oriented structure had a thickness of 3.0 mils and individual layers had target thicknesses as set forth above in Example 4.

EXAMPLE 20

For comparative purposes, the procedure of Example 11 was repeated with the only exception being a difference in orientation condition. The preheat temperature was. 200° F. and hot bath was 195° F.

EXAMPLES 21–40

To evaluate their physical properties, the oriented multilayer films of Examples 1–19 were tested for instrumented impact and free shrink. Examples 6 and 7 are based on core layers of XU 59243.00, a homogeneous branched ethylene octene from Dow which has a density of 0.904 g/cc and a 0.8 MI, a density and melt index essentially the same as that for Attane 4203, the heterogeneous linear ethylene octene copolymer employed in Comparative Examples 19 and 20. However, the film structures of Examples 6 and 7 show greatly improved peak load and energy to break as compared to the films of Examples 19 and 20, respectively. The results are given in Table below.

TABLE I

| EX.# L&T | FILM OF | PEAK LOAD (lbs) | ENERGY TO BREAK (ft. lbs) | FREE SHRINK |
|---|---|---|---|---|
| 21 | 1 | 49 | 2.3 | 83 |
| 22 | 2 | 53 | 2.9 | 80 |
| 23 | 3 | 64 | 4.2 | 81 |
| 24 | 4 | 83 | 6.2 | 86 |
| 25 | 5 | 68 | 4.9 | 76 |
| 26 | 6 | 98 | 9.3 | 75 |
| 27 | 7 | 90 | 8.0 | 67 |
| 28 | 8 | 84 | 7.4 | 76 |
| 29 | 9 | 73 | 5.4 | 70 |
| 30 | 10 | 70 | 5.1 | 77 |
| 31 | 11 | 74 | 6.0 | 73 |
| 32 | 12 | 81 | 5.4 | 68 |
| 33 | 13 | 82 | 6.0 | 66 |
| 34 | 14 | 77 | 6.5 | 96 |
| 35 | 15 | 58 | 5.0 | 78 |
| 36 | 16 | 75 | 6.3 | 96 |
| 37 | 17 | 56 | 4.9 | 80 |
| 38 | 18 | 81 | 10.6 | 77 |
| 39 | 19 | 78 | 5.1 | 79 |
| 40 | 20 | 75 | 5.6 | 74 |

EXAMPLES 41–60

To evaluate the processability of the homogeneous branched ethylene octene copolymers found in each of the above film structures, the orientation speed was noted for each structure at each orientation temperature. Surprisingly, the film structures containing the homogeneous branched ethylene octene copolymers from Dow which showed improved toughness in Examples 20–36 above generally oriented faster than the films of Comparative Examples 19 and 20. The results are given in Table II below.

TABLE II

| EX.# | FILM OF | PRE-HEAT (°F.) | HOT BATH (°F.) | ORIENTATION SPEED (ft/min) |
|---|---|---|---|---|
| 41 | 1 | 192 | 197 | 51 |
| 42 | 2 | 192 | 197 | 53 |
| 43 | 3 | 192 | 197 | 50 |
| 44 | 4 | 191 | 184 | 32 |
| 45 | 5 | 199 | 195 | 45 |
| 46 | 6 | 194 | 190 | 33 |
| 47 | 7 | 200 | 195 | 40 |
| 48 | 8 | 194 | 190 | 30 |
| 49 | 9 | 200 | 195 | 37 |
| 50 | 10 | 194 | 190 | 33 |
| 51 | 11 | 200 | 195 | 40 |
| 52 | 12 | 197 | 194 | 32 |
| 53 | 13 | 200 | 195 | 35 |
| 54 | 14 | 187 | 181 | 40 |
| 55 | 15 | 200 | 195 | 51 |
| 56 | 16 | 188 | 182 | 36 |
| 57 | 17 | 200 | 195 | 46 |
| 58 | 18 | 200 | 195 | 53 |
| 59 | 19 | 194 | 190 | 32 |
| 60 | 20 | 200 | 195 | 36 |

EXAMPLES 61–62

To evaluate the processability of the homogeneous long chain branched ethylene octene copolymers incorporated into the present film structures, the head pressures were noted during extrusion of both the substrate and the coating of the films of Example 6 and Comparative Example 19. Examples 1–5 and 8–17 are not included in Table III below because valid comparisons can only be made between resins of the same melt index. Example 18 is not included because it was not made under comparable extrusion conditions. It should be noted that although the films of Examples 7 and 19 contain the same polymeric materials as those of Examples 6 and 18, evaluated below, they are not included because they result from the same extrusion runs. That is, Example 7 is the orientation of the unoriented tape structure described in Example 6 under differing orientation conditions from those described in Example 6. The same can be said for Example 20 with respect to Example 19. The homogeneous branched ethylene octene copolymer employed in Example 6 provided lower extrusion head pressures than the heterogeneous linear ethylene octene copolymer of Example 19.

TABLE III

| EX.# | FILM OF | HEAD PRESSURE OF 1ST EXTRUDER (psi) | HEAD PRESSURE OF 2ND EXTRUDER (psi) |
| --- | --- | --- | --- |
| 58 | 6 | 5230 | 5750 |
| 59 | 19 | 5600 | 6267 |

EXAMPLE 63

The procedure set forth in Example 1 was repeated with the two core layers being replaced with a blend of 80% by weight of XU59243.00, a homogeneous ethylene octene copolymer having a density of 0.904 g/cc and a 0.8 MI with long chain branching sold on a developmental basis by Dow, and 20% by weight of LD-318.92,a 9% VA ethylene vinyl acetate sold by Exxon. The XU59243.00 resin has an $I_{10}/I_2$ of 9.2 and a Mw/Mn of 2.17

The final oriented structure had a thickness of 3.0 mils. The individual layers had a target thickness as follows:

Seal/Core/Outer//Barrier/tie/Core/Abuse
0.36 1.59 0.15  0.18 0.15 0.39 0.17

EXAMPLE 64

The procedure set forth in Example 1 was repeated with the two core layers being replaced with a blend of 90% by weight of XU 59243.00 and 10% by weight of LD-318.92 from Exxon.

The final oriented structure had a thickness of 3.0 mils. The individual layers had a target thickness as follows:

Seal/Core/Outer//Barrier/tie/Core/Abuse
0.36 1.59 0.15  0.18 0.15 0.39 0.17

EXAMPLE 65

The procedure set forth in Example 1 was repeated with the two core layers being replaced with a blend of 80% by weight of XU59243.00 and 20% by weight of Elvax 3175GC, a 28% VA ethylene vinyl acetate sold by DuPont The final oriented structure had a thickness of 3.0 mils. The individual layers had a target thickness as follows:

Seal/Core/Outer//Barrier/tie/Core/Abuse
0.36 1.59 0.15  0.18 0.15 0.39 0.17

EXAMPLE 66

The procedure set forth in Example 1 was repeated with the two core layers being replaced with a blend of 90% by weight of XU59243.00 and 10% by weight of Elvax 3175GC from DuPont.

The final oriented structure had a thickness of 3.0 mils. The individual layers had a target thickness as follows:

Seal/Core/Outer//Barrier/tie/Core/Abuse
0.36 1.59 0.15  0.18 0.15 0.39 0.17

EXAMPLE 67

The procedure set forth in Example 1 was repeated with the two core layers being replaced with a blend of 85% by weight of XU59243.00 and 15% by weight of Escorene LD-720.92, a 19% VA ethylene vinyl acetate sold by Exxon.

The final oriented structure had a thickness of 3.0 mils. The individual layers had a target thickness as follows:

Inner/Core/Outer//Barrier/tie/Core/Abuse
0.36 1.59 0.15  0.18 0.15 0.39 0.17

EXAMPLE 68–72

The oriented multilayer films of Examples 63–67 were tested for instrumented impact and free shrink. The results are given below in Table II.

TABLE IV

| EX.# | FILM OF | INSTRUMENTED IMPACT | | FREE SHRINK L&T |
| --- | --- | --- | --- | --- |
| | | PEAK LOAD (lbs) | ENERGY TO BREAK (ft. lbs.) | |
| 68 | 63 | 84 | 5.6 | 74 |
| 69 | 64 | 86 | 5.8 | 76 |
| 70 | 65 | 84 | 5.0 | 82 |
| 71 | 66 | 96 | 6.2 | 80 |
| 72 | 67 | 85 | 5.1 | 80 |

The foregoing description of preferred embodiments of the invention have been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

I claim:

1. A heat shrinkable multilayer film comprising at least one inner core layer comprising a homogeneous single site catalyzed copolymer of ethylene and an alpha-olefin having from four to ten carbon atoms and having at least some long chain branching said copolymer having a density of from about 0.89 g/cc to about 0.91 g/cc.

2. The heat shrinkable film of claim 1 wherein said alpha-olefin having from four to ten carbon atoms is octene.

3. The heat shrinkable film of claim 1 wherein said homogeneous branched copolymer is blended with another thermoplastic homopolymer or copolymer.

4. The heat shrinkable film of claim 3 wherein said other thermoplastic homopolymer or copolymer is a copolymer of ethylene and a second comonomer selected from the group consisting of vinyl acetate, alkyl acrylate, carbon monoxide, butadiene, styrene, acrylic acid, methacrylic acid, a metal neutralized salt of an acrylic acid, and an alpha-olefin.

5. A heat shrinkable multilayer film comprising at least two core layers, each of said core layers comprising a homogeneous single site catalyzed copolymer of ethylene and an alpha-olefin having from four to ten carbon atoms and having at least some long chain branching said copolymer having a density of from about 0.89 to about 0.91.

6. The heat shrinkable film set forth in claim 5 wherein the homogeneous branched copolymer of one of said two core layers is identical to the homogeneous branched copolymer of the other of said layers.

7. The heat shrinkable film set forth in claim 5 wherein the alpha-olefin having from four to ten carbon atoms is octene.

8. The heat shrinkable film of claim 5 wherein said homogeneous branched copolymer is blended with another thermoplastic homopolymer or copolymer.

9. The heat shrinkable film of claim 5 wherein said other thermoplastic homopolymer or copolymer is a copolymer of ethylene and a second comonomer selected from the group consisting of vinyl acetate, alkyl acrylate, carbon monoxide, butadiene, styrene, acrylic acid, methacrylic acid, a metal neutralized salt of an acrylic acid, and an alpha-olefin.

10. The heat shrinkable film of claim 5 wherein the homogeneous branched copolymer has a density of from about 0.90 g/cc to about 0.91 g/cc.

11. A heat shrinkable multilayer film comprising the general structure:

seal/core/barrier/core/abuse wherein each of the core layers comprises the same homogeneous long chain branched single-site catalyzed copolymer of ethylene and an alpha-olefin having from four to ten carbon atoms, said copolymer having a density of from about 0.89 g/cc to about 0.91 g/cc.

12. The heat shrinkable film of claim 11 wherein said alpha-olefin having from four to ten carbon atoms is octene.

13. The heat shrinkable film of claim 11 wherein said homogeneous branched copolymer is blended with another thermoplastic homopolymer or copolymer.

14. The heat shrinkable film of claim 13 wherein said other thermoplastic homopolymer or copolymer is a copolymer of ethylene and a second comonomer selected from the group consisting of vinyl acetate, alkyl acrylate, carbon monoxide, butadiene, styrene, acrylic acid, methacrylic acid, a metal neutralized salt of an acrylic acid, and an alpha-olefin.

15. The heat shrinkable film of claim 11 wherein the homogeneous branched copolymer has a density of from about 0.90 g/cc to about 0.91 g/cc.

16. The heat shrinkable film of claim 11 wherein the barrier layer comprises a vinylidene chloride copolymer.

17. The heat shrinkable film of claim 16 wherein the barrier layer comprises a vinylidene chloride-methyl acrylate copolymer.

18. The heat shrinkable film of claim 111 wherein the seal layer comprises a copolymer of ethylene and a comonomer selected from the group consisting of vinyl acetate, alkyl acrylate, acrylic acid, methacrylic acid, a metal neutralized salt of an acrylic acid, and an alpha olefin.

19. The heat shrinkable film set forth in claim 11 further including additional internal layers to promote interlayer adhesion.

20. A heat shrinkable multilayer film comprising:
a) a seal layer;
b) a first core layer comprising a homogeneous, long chain branched ethylene alpha-olefin copolymer having a density of from about 0.89 g/cc to about 0.91 g/cc;
c) a barrier layer;
d) a second core layer comprising a homogeneous, long chain branched ethylene alpha-olefin copolymer having a density of from about 0.891 g/cc to about 0.91 g/cc; and
e) an abuse layer;
wherein the homogeneous, branched ethylene alpha-olefin of the first core layer differs from that of the second core layer.

21. The heat shrinkable film claim 20 further including additional internal layers to promote interlayer adhesion.

22. A multilayer heat shrinkable film comprising:
a) a sealing layer comprising a homogeneous, single site catalyzed copolymer of ethylene and a alpha-olefin with four to ten carbon atoms, said copolymer having long chain branching and a density of from about 0.89 g/cc to about 0.91 g/cc;
b) a barrier layer; and
c) an abuse layer comprising a homogeneous single site catalyzed copolymer of ethylene and a alpha-olefin with four to ten carbon atoms, said copolymer having long chain branching and a density of from about 0.89 g/cc to about 0.91 g/cc.

23. A heat shrinkable multi-layer film comprising the general structure:

seal/core/barrier/core/abuse wherein each of the two core layers comprises the same homogeneous copolymer of ethylene and octene having an $I_{10}/I_2$ greater than or equal to 5.63 and a Mw/Mn, less than or equal to $(I_{10}/I_2)-4.63$, said copolymer having a density of from about 0.89 g/cc to about 0.91 g/cc.

24. The heat shrinkable film of claim 23 wherein at least one of said core layers further includes another thermoplastic homopolymer or copolymer blended with the homogenous ethylene octene polymer.

25. The heat shrinkable film of claim 24 wherein said other thermoplastic homopolymer or copolymer is a copolymer of ethylene and a second comonomer selected from the group consisting of vinyl acetate, alkyl acrylate, carbon monoxide, butadiene, styrene, acrylic acid, methylacyrlic acid, a metal neutralized salt of an acrylic acid and an alpha olefin.

26. The heat shrinkable film of claim 25 further including additional internal layers to promote interlayer adhesion.

27. A heat shrinkable multilayer film as set forth in claim 26 wherein the homogenous ethylene octene copolymer of said first core layer differs from that of said second core layer.

28. The heat shrinkable multilayer film comprising:
a) a sealing layer;
b) a first core layer comprising a homogeneous ethylene octene copolymer having an $I_{10}/I_2$ greater than or equal to 5.63 and an Mw/Mn less than or equal to $(I_{10}/I_2)-4.63$ and having a density of from about 0.89 g/cc to about 0.91 g/cc;
c) a barrier layer;
d) a second core layer comprising a homogenous ethylene octene copolymer having an $I_{10}/I_2$ greater than or equal to 5.63 and an Mw/Mn less than or equal to $(I_{10}/I_2)-$ 4.63 and having a density of from about 0.89 g/cc to about 0.91 g/cc;

e) an abuse layer.

29. The heat shrinkable film set forth in claim 28 further including additional internal layers to promote interlayer adhesion.

30. The heat shrinkable film set forth in claim 28 wherein the homogenous ethylene octene copolymer of at least one of said first and second core layers is blended with another thermoplastic homopolymer or copolymer.

31. The heat shrinkable film set forth in claim 30 wherein said other thermoplastic homopolymer or copolymer is a copolymer of ethylene and a second comonomer selected from the group consisting of vinyl acetate, alkyl acrylate, carbon monoxide, butadiene, styrene, acrylic acid, methacrylic acid, a metal neutralized salt of an acrylic acid and an alpha olefin.

32. A heat shrinkable multi-layer film comprising the general structure:

seal/core/abuse wherein the core layer comprises a homogeneous long chain branched single site catalyzed copolymer of ethylene and an alpha-olefin having from four to ten carbon atoms, said copolymer having a density of from about 0.89 g/cc to about 0.91 g/cc.

33. The heat shrinkable film of claim 32 further including a second core layer, said core layer comprising a homogeneous long chain branched single site catalyzed copolymer of ethylene and an alpha-olefin having from four to ten carbon atoms, said copolymer having a density of from about 0.89 g/cc to about 0.91 g/cc.

\* \* \* \* \*